United States Patent [19]

Tamaru

[11] Patent Number: 4,888,479
[45] Date of Patent: Dec. 19, 1989

[54] TOUCH PANEL APPARATUS

[75] Inventor: Hideshi Tamaru, Kanagawa, Japan

[73] Assignee: Sony Corporation, Tokyo, Japan

[21] Appl. No.: 315,470

[22] Filed: Feb. 24, 1989

[30] Foreign Application Priority Data

Mar. 7, 1988 [JP] Japan .................................. 63-53186
Nov. 18, 1988 [JP] Japan ................................ 63-291934

[51] Int. Cl.⁴ .............................................. G01V 9/04
[52] U.S. Cl. .................................. 250/221; 250/222.1; 341/31
[58] Field of Search ................ 250/221, 222.1; 341/31

[56] References Cited

U.S. PATENT DOCUMENTS

| | | | |
|---|---|---|---|
| 3,025,406 | 3/1962 | Stewart et al. .................... | 250/222.1 |
| 3,584,226 | 6/1971 | Lerner ................................ | 250/222.1 |
| 4,313,109 | 1/1982 | Funk et al. ........................ | 250/221 |
| 4,347,438 | 8/1982 | Spielman ........................... | 250/221 |
| 4,645,920 | 2/1987 | Carroll et al. .................... | 250/222.1 |
| 4,794,248 | 12/1988 | Gray .................................. | 250/221 |

Primary Examiner—David C. Nelms
Assistant Examiner—Khaled Shami
Attorney, Agent, or Firm—Limbach, Limbach & Sutton

[57] ABSTRACT

A touch panel apparatus having a display, a first beam generator for generating a first set of beams skewed to the right, arranged in parallel to each other and aligned from the upper left to the lower right relative to the display surface of the display, a first beam scanner coupled to the first beam generator for scanning the display surface by the first set of beams with a predetermined sequence, a second beam generator for generating a second set of beams skewed to the left, arranged in parallel to each other and aligned from the upper right to the lower left relative to the display surface of the display, a second beam scanner coupled to the second beam generator for scanning the display surface by the second set of beams with a predetermined sequence, a first calculator for determining a first address based on an interrupted beam first appearing in the alignment sequence of the first set of beams, and a second calculator for determining a second address based on an interrupted beam first appearing in the alignment sequence of the second set of beams.

5 Claims, 7 Drawing Sheets

TOUCH PANEL APPARATUS

BACKGROUND OF THE INVENTION

1. Field of the Invention

This invention is directed generally to a coordinate detecting device employing a plurality of infra-red light beams, and particularly to such a device having a specially designed data processing circuit in order to reduce erroneous determination of the coordinates.

2. Description of the Prior Art

A touch panel system employing a plurality of light beams is well-known and described in U.S. Pat. Nos. 3,764,813, 3,775,560, etc. Such a touch panel system generally consists of a coordinate detection device and a display device, and forms a man-machine interface for any kind of computer system.

Specifically, as described in the above-mentioned U.S. patents, a plurality of light emitting diodes (LED) linearly arranged on a printed circuit board located on the left side of the display screen of a display device, such as a cathode ray tube (CRT), emit infra-red light beams which are received by a plurality of photo-transistors linearly arranged on a printed circuit board located on the right side of the display screen. At the same time, a plurality of light emitting diodes (LED) linearly arranged on a printed circuit board located on the bottom side of the display screen emit infra-red light beams which are received by a plurality of photo-transistors linearly arranged on a printed circuit board located on the top side of the display screen, thereby forming a grid of the infra-red light beams. Each of the LED and photo-transistor pairs is assigned a different address.

It can be known which of the LEDs emits the light beam and which of the photo-transistors on the opposite side detects the light beam by sequentially specifying the address to change the respective LEDs and the photo-transistors coupled therewith to form the pairs. A touch on the display screen with a finger or a pen causes interruption of a certain infra-red light beam. The X and Y coordinates at a location where the light beam is interrupted are transferred to a host computer to determine the touched position. The touch panel system is constructed such that the light beam is interrupted by a touch on the optical grid plane formed of the infra-red beams so that the sensing plane (optical grid plane) is made even.

Since the above-mentioned conventional optical touch panel device has an even sensing plane, if it is combined with a CRT having a curved display surface, a defect is encountered in that parallax is caused in peripheral portions of the CRT. For this reason, instructions for input data cannot be displayed on the CRT in a fine manner. Also, there is a fear of malfunction. Such parallax is caused by the fact that the infra-red light beams extend in straight lines over the curved display screen of the CRT. In other words, the infra-red light beams pass near the display screen at its central portion but far from the display screen in the vicinity of the edges thereof. Therefore, even if the operator touches a point near an edge of the display screen, parallax makes it difficult to interrupt the infra-red light beam corresponding to the desired point to be touched.

A touch panel device which can overcome the above-mentioned defects has been proposed by a co-pending U.S. application No. 300,333, filed Jan. 23, 1989, assigned to the present assignee.

However, even if the parallax problem can be solved, there remains various problems of providing a touch panel system free of malfunctions.

For example, assume that an operator touches an image (not shown) representing a command or the like displayed on the screen of a display apparatus by a finger (forefinger). If the other fingers are not adequately bent, one of them (for example, the thumb or the middle finger) may interrupt one of the infra-red beams at its tip.

In a conventional touch panel system in which the sensing plane is formed by infra-red beams orthogonally arranged in front of a rectangular screen, if the beams for detecting and determining the touched position in the vertical (up and down) direction (V direction) are sequentially emitted from the top side (in other words, carrying out the scanning from the top side to the bottom side), an infra-red beam is interrupted by the tip of the forefinger directing to the screen from the bottom side of the screen, whereby the touched position is determined by the first interrupted infrared beam.

However, as to the beams for detecting and determining a touched position in the horizontal (left and right) direction (H direction), the beam may be interrupted by the thumb on the left side of the forefinger or the middle finger on the right side of the forefinger (the positional relationship of the fingers is opposite if the operator touches the screen with the left hand) prior to the forefinger, depending on the scanning direction, that is, from left to right or from right to left, of the touch panel system, whereby a different position is erroneously determined as the desired touched position by the conventional touch panel system.

As described above, such a conventional touch panel system in which the sensing plane is formed by infra-red beams orthogonally arranged in front of its rectangular screen can possibly malfunction due to a hand of the operator which specifies a coordinate point on the touch panel.

OBJECTS AND SUMMARY OF THE INVENTION

It is an object of the present invention to provide a novel touch panel apparatus.

It is another object of the present invention to provide a touch panel apparatus of infra-red beam type which employs skewed beams with respect to its display surface.

It is a yet another object of the present invention to provide a touch panel apparatus employing skewed beams which is provided with a signal processing circuit to perform a detection method which can reduce malfunctions, in view of the human engineering.

It is a further object of the present invention to provide a touch panel system in which the positional relationship between the arrangement of infra-red beams and fingers except a directing finger is improved.

It is a yet further object of the present invention to provide a touch panel system in which even if a plurality of beams are interrupted, malfunction can be avoided.

According to a first object of the present invention, there is provided a touch panel apparatus comprising:
a display;
a first beam generating means for generating a first set of beams skewed to the right, arranged in parallel to each other and aligned from upper left to lower right relative to the display surface of the display;

a first beam scanning means coupled to the first beam generating means for scanning the display surface by the first set of beams with a predetermined sequence;

a second beam generating means for generating a second set of beams skewed to the left, arranged in parallel to each other and aligned from upper right to lower left relative to the display surface of the display;

a second beam scanning means coupled to the second beam generating means for scanning the display surface by the second set of beams with a predetermined sequence;

first detecting means for determining a first address based on an interrupted beam first appearing in the alignment sequence of the first set of beams; and second detecting means for determining a second address based on an interrupted beam first appearing in the alignment sequence of the second set of beams.

Preferably also included is address determining means coupled to the first and second detecting means for determining a final address by calculating a mean value of addresses of light beams interrupted in a row.

These and other objects, features and advantages of the present invention will become apparent from the following detailed description of the preferred embodiment taken in conjunction with the accompanying drawings, throughout which like reference numerals designate like elements and parts.

DETAILED DESCRIPTION OF THE PREFERRED EMBODIMENT

Figure 1:
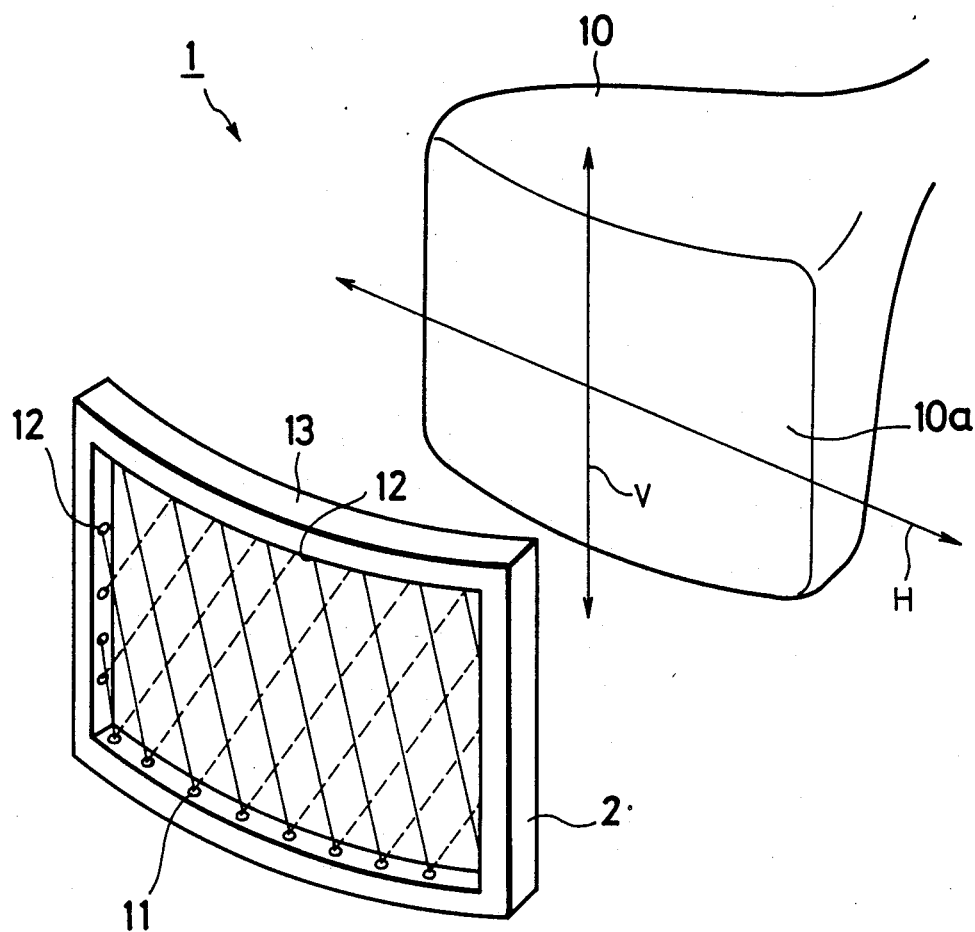
FIG. 1 is a perspective view showing the construction of an embodiment of a touch panel apparatus according to the present invention.

A touch panel apparatus 1 according to the present invention consists of a cathode ray tube (CRT) 10 and a coordinate detecting device 2, as shown in FIG. 1. The display surface 10a of the CRT 10 has a cylindrical form and has a curvature only in the lateral direction (indicated by H in FIG. 1) and has no curvature in the vertical direction (indicated by V in FIG. 1). Printed circuit boards, though not shown, are located along the four sides of the display surface 10a.

On the printed circuit boards on the bottom side and both of the lateral sides there are aligned a plurality of light emitting elements, for example, light emitting diodes 11 along the curved plane of the CRT 10, while on the printed circuit boards on the top side and both lateral sides there are aligned a plurality of light receiving elements, for example, photo-transistors 12 arranged opposite to the light emitting diodes 11 to establish corresponding photo coupling relationships therebetween.

Among the skewed beams emitted from the light emitting diodes 11 and directed to the photo-transistors 12, those indicated by solid lines in FIG. 1 are leftwardly skewed beams (L beams) and those indicated by broken lines in FIG. 1 are rightwardly skewed beams (R beams). The light emitting diodes 11 are scanned by a selector provided in the printed circuit board, and the photo-transistors 12 are also scanned corresponding to the light emitting diodes 11 by a selector provided in the printed circuit board. The objective coordinates are optically detected by the light coupling means formed of the light emitting diodes 11 and the photo-transistors 12.

The coordinate detecting device 2 thus constructed is incorporated in a bezel 13 and then integrated with the CRT 10 to form the touch panel apparatus 1.

The construction of a particular form of the coordinate detecting device 2 shown in FIG. 1 is described in further detail in the aforementioned copending application. That description is incorporated herein by reference.

Figure 2A:
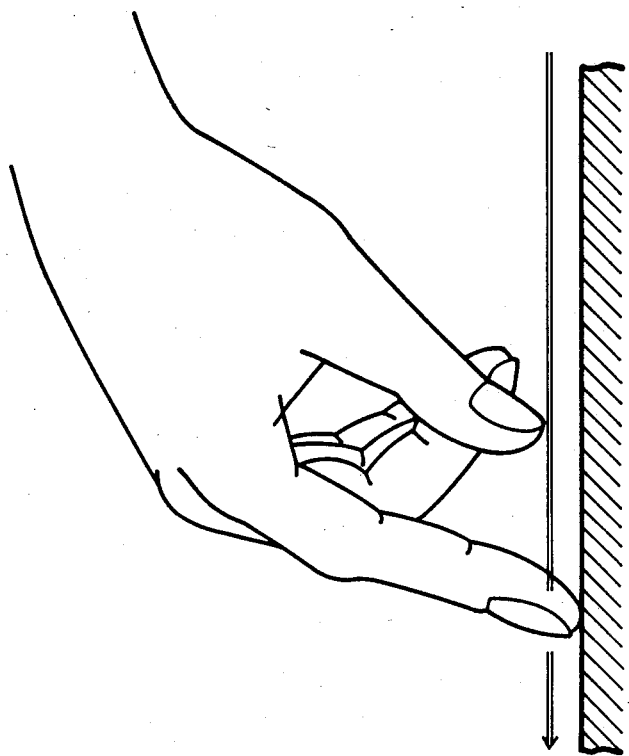
FIGS. 2A and 2B are respectively a side view and a top plan view showing a panel touch operation used for explaining the present invention.
Figure 2B:
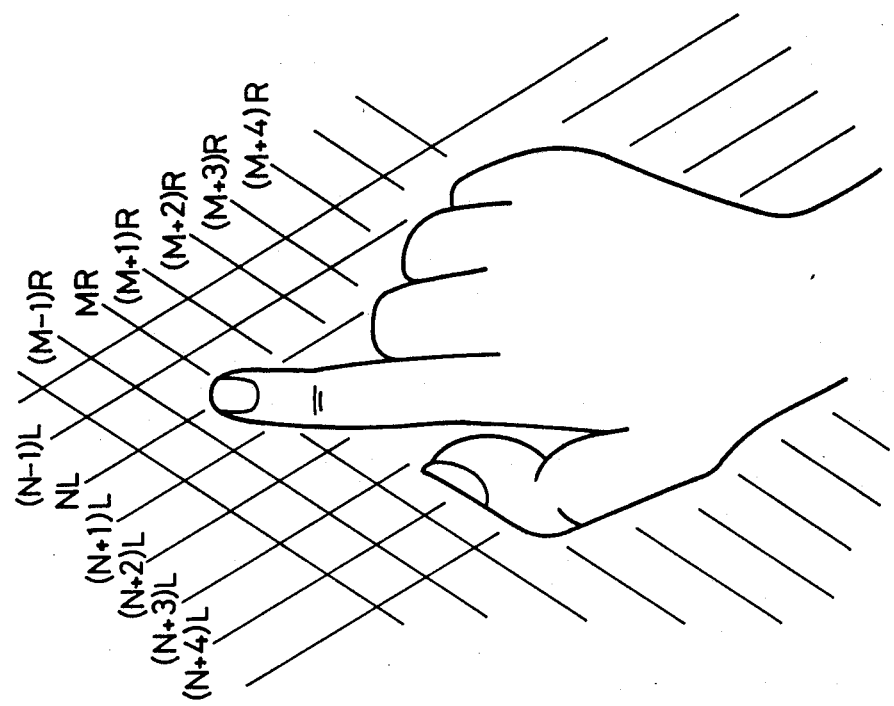

According to the touch panel attached to the screen of the display, the operator positioned at the bottom side of the touch panel faces the screen and then operates the same. FIGS. 2A and 2B illustrate the relationship between the hand of the operator and the light beams (infra-red beams) of the touch panel. FIG. 2A is its side view and FIG. 2B its top plan view. Generally, an image displayed on the screen representative of commands or the like is touched by a finger (forefinger) of the operator. However, if his other fingers are not adequately bent as shown in FIG. 2A, the tips of these fingers (the thumb or the middle finger in the case of FIG. 2A) may interrupt light beams.

However, in the conventional touch panel system in which the sensing plane is formed by infra-red beams orthogonally arranged in front of a rectangular picture screen, if the beams for detecting and determining a touched position in the vertical direction (V direction) are sequentially emitted and received from the top side, that is, if the scanning of light beams is carried out downwardly from the top side, an infra-red beam is interrupted by the tip end of the forefinger directing to the screen from the bottom side of the screen, whereby the touched position is determined by the first interrupted infra-red beam. However, the beams for detecting and determining a touched position in the horizontal direction (H direction) may be interrupted by the thumb on the left side of the forefinger or the middle finger on the right side of the forefinger (the positional relationship of the fingers is opposite if the operator touches the screen with the left hand) prior to the forefinger, depending on the scanning direction of the touch panel system, that is, from left to right or from right to left, whereby a different position is erroneously determined as the desired touched position, and accordingly a malfunction occurs.

To overcome such malfunction, the embodiment of the present invention provides two sets of parallel light beams (infra-red beams) which are substantially symmetrically emitted in respective skewed directions with respect to the position of the operator (the vertical direction of the image) as shown in FIG. 2B. The rightwardly skewed beams (R beams) scan the screen from its upper left to its lower right, that is, in the order of 1R, 2R, 3R (M−1)R, MR, . . . , while the leftwardly skewed beams (L beams) scan the screen from its upper right to its lower left, that is, in the order of 1L, 2L, 3L1

(N−1)L, NL, ..., (N−1)L, NL, ... The terms "left" and "right" are taken from the view facing outwardly from the screen.

In the above-mentioned manner, the respective beams thus arranged are first interrupted by the tip end of the forefinger, except for the case where the hand is extremely extended, whereby the coordinate values are positively determined. In this case, the light beams scan the screen in such a manner that the pointing finger is swept from above by the light beams. Alternatively, the light beams may scan the screen in such a direction to sweep the pointing finger from below. In the latter case, the position at which the corresponding light beam is finally interrupted is taken as the determined coordinate values. Namely, the R beams scan the screen from its lower right to its upper left in the order of ... (M+4)R, (M+3)R, ..., MR, (M−1)R, ..., while the L beams scan the screen from its lower left to its upper right in the order of (N+4)L, (N+3)L, ..., NL, (N−1)L, ... . Then, the position finally interrupted by the tip end of the forefinger is taken as the determined coordinate values.

It is therefore possible to eliminate detection and determination of erroneous coordinates by obtaining the corresponding coordinate values on the plane field from the two coordinate values thus determined.

Reference is next made to a system for determining coordinate values.

Two types of such a system can be thought of: One is a scan stop system which stops the scanning when an interrupted beam is detected and then carrys out a new scanning from the beginning. The other is a sequential scan system which continues the scanning throughout the whole display area regardless of the existance of beam interruption. The sequential scan system may detect a plurality of beam interruptions. In such a circumstance, coordinate values are determined in the following manner.

Table I below shows relationships between conditions of the beams interruption and determined coordinates.

TABLE I

| Beam Interruption | Determination |
|---|---|
| 0 | |
| 1 (One beam interrupted) | determination of coordinates |
| 2 (Two adjacent beams interrupted) | Determined at intermediate position |
| 3 to 4 (Adjacent beams interrupted) | Determined at intermediate position of first & second interrupted beams |
| 5 or more (Adjacent beams interrupted) | Determined as error |
| 1 + 1 (Beams interrupted, not interrupted, interrupted) | Determined as error |
| 1 + 2 | Determined as error |
| 1 + 3 | Determined as error |
| 2 + 1 | Determined as error |
| 2 + 2 | Determined as error |
| 2 + 3 | Determined as error |
| 1 + 1 + 1 | Determined as error |
| and so on | |

("+" means a non-interrupted beam)

In Table I, Beam Interruption 1 represents that only one beam is interrupted, wherein the coordinates are determined from the position of the interrupted point. Beams Interruption 2 represents a case where two adjacent beams are interrupted, wherein coordinates are determined at the intermediate position of the two beams. Specifically, if the beams NL and (n+1)L, for example, are interrupted at the same time by the finger, the coordinate detection process is effected as if a virtual beam existed at the intermediate position between the two beams. If three to four beams are interrupted, the coordinates are determined at the intermediate position of the beams first and secondly interrupted beams. For example, if beams (N−1)L, NL, (N+1)L are sequentially interrupted in this order, the coordinates are determined at the intermediate position of the first interrupted beam (N31 1)L and the second interrupted beam NL.

Other occasions than the above-mentioned interruptions, for example, five beams are sequentially interrupted, a first beam is interrupted and the next beam is not interrupted and then the following beam from the not interrupted beam is also interrupted or the like, are all treated as error.

As described above, the coordinates are determined only when one beam is interrupted or when a plurality of beams (up to four beams) are sequentially interrupted. In the latter case, the coordinates of the intermediate point of the first and secondly interrupted beams are determined as the coordinates.

Table II below shows further relationships between interruption conditions of the L and R beams and the coordinate determination.

TABLE II

| Beam Interruption | Determination |
|---|---|
| 0 | |
| 1 (One beam interrupted) | Determination of coordinates |
| 2–4 (Adjacent beams interruption) | Mean values of coordinates of interrupted beams |
| 5 or more (Adjacent beams interrupted) | Mean values of coordinates of first four interrupted beams |
| 1 + 1 | Error |
| 1 + 2 | |
| 1 + 3 | |
| 4 + 1, 4 + 2, 4 + 3, 5 + 1, 5 + 2, 5 + 3, 5 + 4 | Mean values of coordinate of first four interrupted beams |
| Others, 4 + 4, 4 + 5, ... 5 + 5, 5 + 6, ... etc. | Error |

In Table II, when Beam Interruption 1 is detected, the coordinates are determined from the interrupted point, in the same manner as that in Table I. When it is detected that two to four beams are successively interrupted, the mean value of the coordinates of the interrupted beams are determined as the specified coordinates. When more than five beams are successively interrupted, the mean values of the coordinates of the first interrupted four beams are determined as the specified coordinates. When two to four beams are successively interrupted, mean values of the coordinates corresponding to the interrupted beams are determined as the specified coordinates. When five or more beams are successively interrupted, the mean values of the coordinates corresponding to the first four interrupted beams are determined as the specified coordinates. Hence, in the case of successively interrupting two to four beams, the mean values of the coordinates of the interrupted beams are always determined as the coordinates of the desired point, while in the case of successively interrupting five or more beams, the mean values of the coordinates of the first interrupted four beams are determined as the coordinates of the desired point. However, if it is detected that more than four beams are first interrupted sequentially and four or less beams discontinuous with the former four beams are next interrupted, the detection is considered to be effective, and the mean values of the coordinates of the four interrupted beams are determined as the desired coordinates.

If any other combination of interrupted beams is detected except for the above, for example, if a first beam is interrupted and the next beam is not interrupted while the following beam to the not interrupted beam is also interrupted or the like, it is treated as all error.

Incidentally, when two adjacent beams, for example, beams NL and (N+1)L are interrupted by the finger, the coordinates are determined on the assumption that a virtual beam exists on the intermediate line of the two interrupted beams. Therefore, the touch panel apparatus according to the present embodiment has the resolution of ½ the interval of the aligned beams. For such possible operation, if it is detected that a beam (NL in the above-mentioned example) is interrupted, at least the adjacent beam ((N+1)L) should be examined whether it is interrupted or not. It should be appreciated that the present embodiment ensures to determine the coordinates of a point specified by a finger on the basis of the beam which is first interrupted.

If the scanning direction of the beams is reversed, the positions of the interrupted beams are stored in a memory of a microcomputer, as will be later referred to, and the coordinates are determined on the basis of the position of the last interrupted beam.

In the above-mentioned embodiment, the leftwardly skewed beams and the rightwardly skewed beams sequentially scan so as to determine the coordinates of a position specified by a finger on the basis of the first or last interrupted beam. It is apparent that the present invention aims at determining the coordinates of a position specified by a finger on the basis of the uppermost position of the interrupted beams in the leftwardly and rightwardly skewed beams. To render the features of the present invention clearly understandable, the operation of the touch panel apparatus according to the present invention will be again explained with reference to FIGS. 2A and 2B which were used for the aforementioned explanation.

In FIG. 2B, the rightwardly skewed beams (R beams) are sequentially designated from the upper left to lower right direction as $(M-1)R$, $MR$, $(M+1)R$, $(M+2)R$, $(M+3)R$, $(M+4)R$, ..., while the leftwardly skewed beams (L beams) are sequentially designated from the upper right to the lower left direction as $1L$, $2L$, ..., $(N-1)L$, $NL$, $(N+1)L$, $(N+2)L$, $(N+3)L$, $(N+4)L$, ... These references may be considered as addresses assigned to respective elements consitituting the beams, i.e. light emitting diodes and photo transistors.

The odd-numbered rightwardly skewed beams (R beams) first scan (are formed) in the order of $1R$, $3R$, $5R$, ..., $(M-1)R$, $(M+1)R$, $(M+3)R$, ..., to the last one (one beam before the last depending on the total number of the beams), where M represents an even number. Next, the even-numbered R beams scan in the order of $2R$, $4R$, ... $MR$, $(M+2)R$, $(M+4)R$, ..., to the last beam. In the same manner, the odd-numbered leftwardly skewed beams (L beams) first scan in the order of $1L$, $3L$, $5L$, ..., $(N-1)L$, $(N+1)L$, $(N+3)L$, ..., to the last one, where N represents an even-number. Next, the evennumbered L beams scan in the order of $2L$, $4L$, ..., $NL$, $(N+2)L$, $(N+4)L$, ..., to the last beam.

Thus, the present embodiment is adapted to detect the first interrupted beam (the address of the interrupted position or the number of the interrupted beam) from the beams aligned as mentioned above and determine the coordinates of a position specified by a finger on the basis of the uppermost interrupted position (MR, NL in FIG. 2) of the beam (or the intermediate position if two beams MR and (M+1)R or NL and (N+1)L are interrupted). It is therefore not necessary that the scanning sequence coincides with the alignment of the beams, i.e. the important matter is not the scanning order but the alignment order of the light beams. However, in the present embodiment the description is made of the case where the alignment of the beams coincides with the scanning sequence thereof.

Figure 3A:
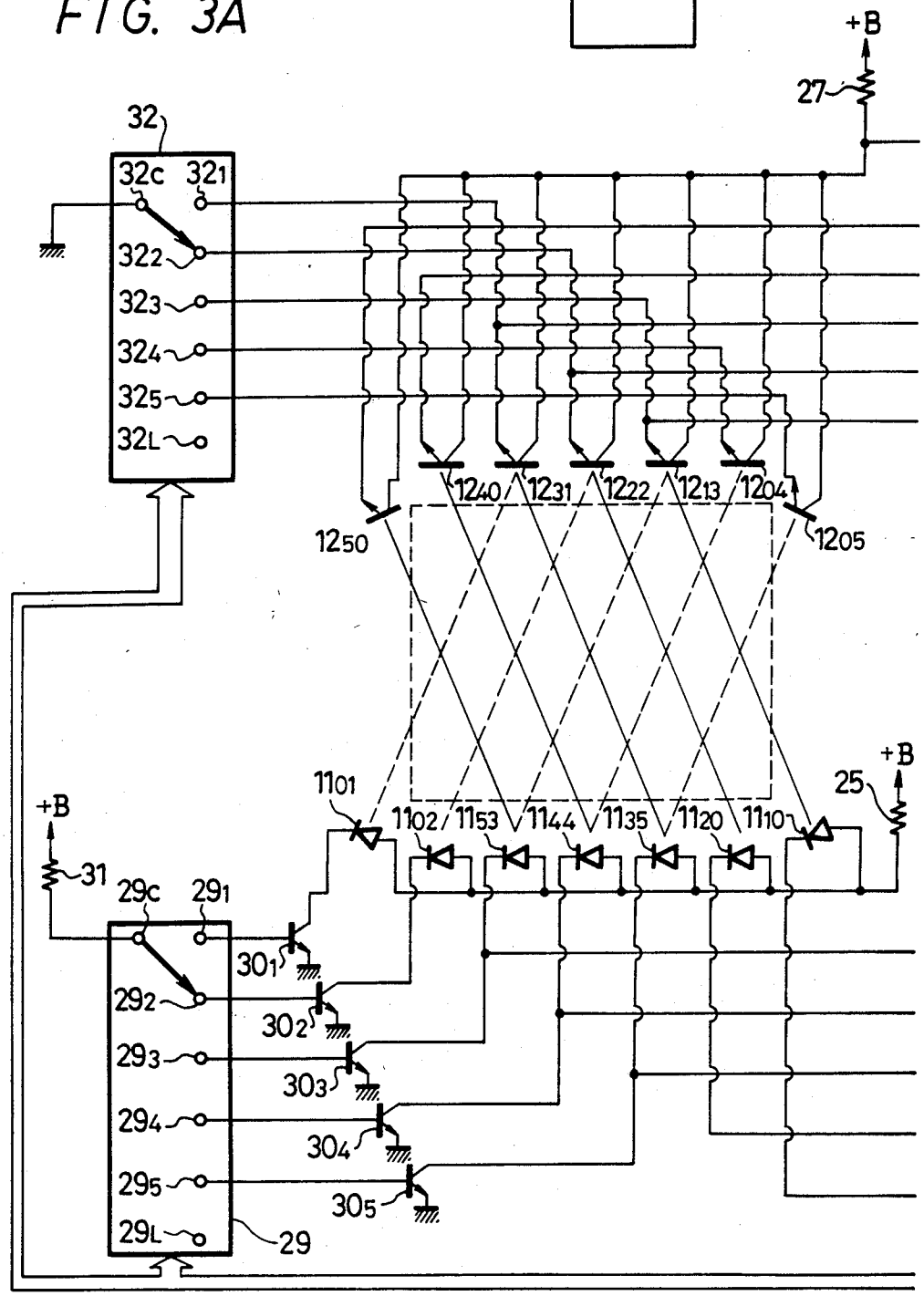
FIGS. 3A and 3B are together a schematic circuit diagram showing an embodiment of the present invention.
Figure 3B:
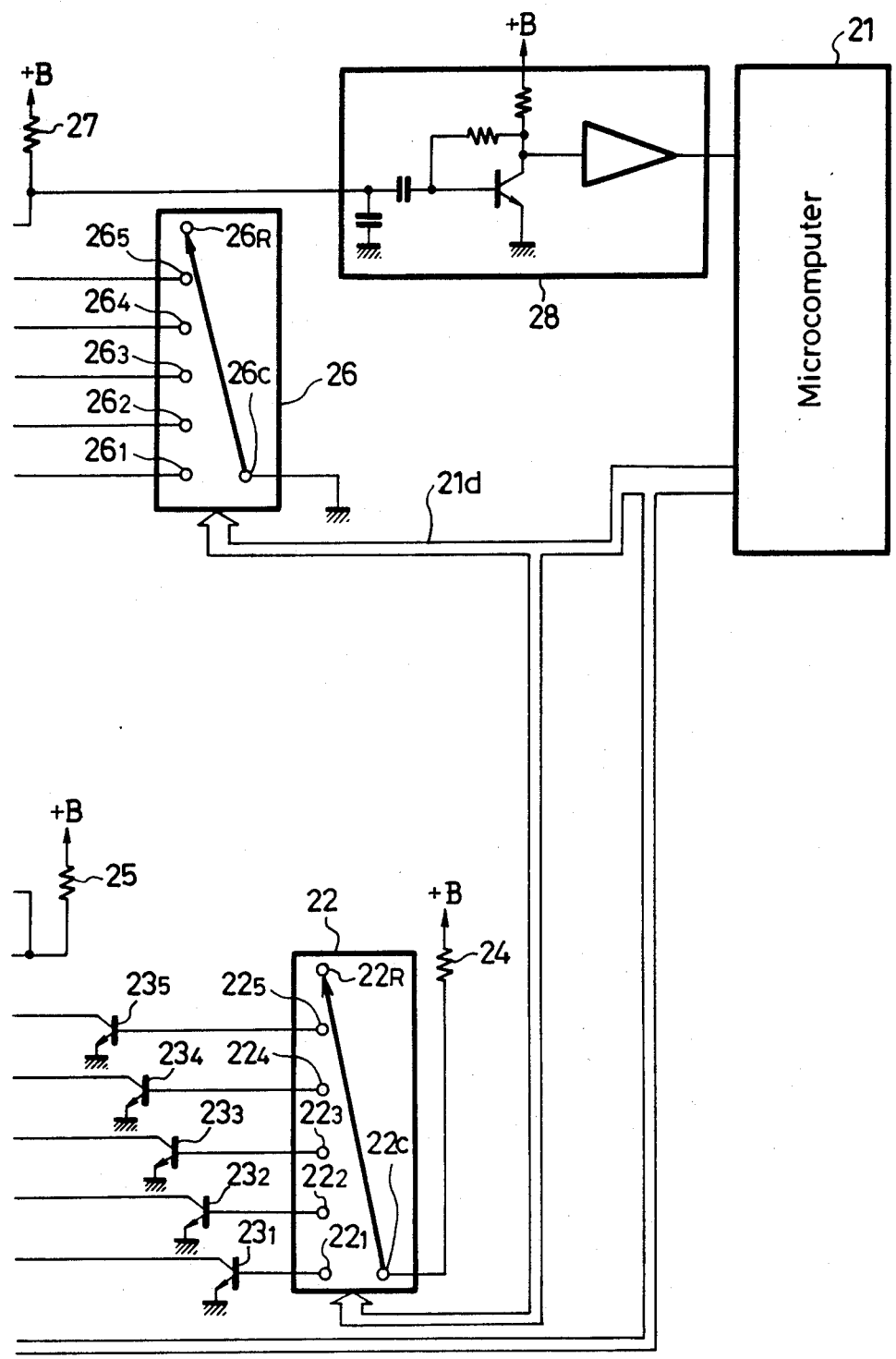

FIGS. 3A and 3B shows an embodiment of the circuit arrangement according to the present invention, wherein light emitting diodes 11 and photo transistors 12 are arranged in a skewed direction with respect to the curved surface of a CRT in a photo-coupling relationship, as described above.

Reference numeral 21 designates a microcomputer and 22 a selector for scanning the light emitting diodes 11 for forming the L beams in response to a control signal for appointing addresses generated by the microcomputer 21. Fixed contacts $22_1$–$22_5$ of the selector 22 are connected to the cathodes of the respective light emitting diodes $11_{10}$, $11_{20}$, $11_{35}$, $11_{44}$ and $11_{53}$ through the respective switching transistors $23_1$–$23_5$ while the movable contact $22c$ of the selector 22 is connected to a positive power supply +B through a resistor 24. The selector 22 also has an open fixed contact $22_R$. The anodes of the light emitting diodes $11_{10}$, $11_{20}$, $11_{35}$, $11_{44}$ and $11_{53}$, connected commonly, are connected to the positive power supply +B through a resistor 25.

Reference numeral 26 designates a selector for scanning the photo transistors 12 for forming the L beams in response to the control signal for appointing addresses (containing the same address data as that supplied to the selector 22) generated by the microcomputer 21. Fixed contacts $26_1$–$26_5$ of the selector 26 are connected to the emitters of the respective photo transistors $12_{13}$, $12_{22}$, $12_{31}$, $12_{40}$ and $12_{50}$ while the movable contact $26c$ of the same is grounded. The selector 26 also has an open fixed contact $26_R$. The collectors of the photo transistors $12_{13}$, $12_{22}$, $12_{31}$, $12_{40}$ and $12_{50}$, connected commonly, are connected to the positive power supply +B through a resistor 27 as well as to a port 1 of the microcomputer 21 through a buffer circuit 28.

Reference numeral 29 designates a selector for scanning the light emitting diodes 11 for forming the R beams in response to the control signal for appointing addresses generated by the microcomputer 21. Fixed contacts $29_1$–$29_5$ of the selector 29 are connected to the cathodes of the respective light emitting diodes $11_{01}$, $11_{02}$, $11_{53}$, $11_{44}$ and $11_{35}$ through switching transistors $30_1$–$30_5$ while the movable contact $29c$ of the same is connected to the positive power supply +B through a resistor 31. The selector 29 also has an open fixed contact $29_R$. The anodes of the light emitting diodes $11_{01}$ and $11_{02}$, connected commonly, are connected to the positive power supply +B through the resistor 25.

Reference numeral 32 designates a selector for scanning the photo transistors 12 concerning the R beams in response to the control signal for appointing addresses (containing the same address data as that supplied to the selector 29) generated by the microcomputer 21. Fixed contacts $32_1$–$32_5$ of the selector 32 are connected to the emitters of the respective photo transistors $12_{31}$, $12_{22}$, $12_{13}$, $12_{04}$ and $12_{05}$ while the movable contact $32c$ of the same is grounded. The selector 32 also has an open fixed contact $32_L$. The collectors of the photo transistors $12_{04}$ and $12_{05}$ connected commonly, are connected to the positive power supply +B through the resistor 27 as well as to the port 1 of the microcomputer 21 through the buffer circuit 28.

During the period in which the movable contacts $29c$ and $32c$ of the selectors 29 and 32 are respectively connected to their open fixed terminals $29_L$ and $32_L$ by the control signal from a port 2 of the microcomputer 21 through a data bus $21d$, the selector 22 sequentially drives the light emitting diodes $11_{10}$, $11_{20}$, $11_{35}$, $11_{44}$ and $11_{53}$ by the control signal supplied from the port 2 of the microcomputer through the data bus $21d$ to sequentially form the L beams and corresponding to this operation, the photo transistors $12_{13}$, $12_{22}$, $12_{31}$, $12_{40}$ and $12_{50}$ are sequentially driven by the selector 26 to receive the L beams, respectively. When the L beams are interrupted by a finger, an L coordinate is detected.

During the period in which the movable contacts $22c$ and $26c$ of the selectors 22 and 26 are respectively connected to the open fixed terminals $22_R$ and $26_R$ by the control signal supplied from the port 2 of the microcomputer through the data bus $21d$, the selector 29 sequentially drives the light emitting diodes $11_{01}$, $11_{02}$, $11_{53}$, $11_{44}$ and $11_{35}$ to sequentially form the R beams. Corresponding to this operation, the photo transistors $12_{31}$, $12_{22}$, $12_{13}$, $12_{04}$ and $12_{05}$ are sequentially driven by the selector 32 to receive the R beams. When the R beams are interrupted by a finger, the corresponding R coordinate is detected.

The light emitting diodes 11, aligned on the bottom side of the displayed area, for emitting infra-red beams in two directions and the photo transistors 12, aligned on the top side of the display area, for receiving the infra-red beams in the two directions are time-division-multiplexed for forming and receiving the L and R beams and parallelly driven so as to be associated with each other. Such construction results in reducing the number of the elements for forming and receiving the beams and accordingly the production cost thereof, compared with a case where the elements for forming and receiving the beams in two directions are arranged and driven independently of each other.

As is apparent from the schematic diagram of FIG. 1, the photo transistors 12 are all disposed in the direction of the bottom side so that they are not so sensitive to external lights (the sun light and a variety of illumination lights which are generally incident on the screen from the upper side). Therefore, a favorable optical S/N ratio is available even if the photo transistors 12 are not directed to the corresponding light emitting diodes 11 in the direction (0 degree) to obtain the maximal light receiving directional characteristic. Thus, there occurs no problem.

Next, the operation of the circuit shown in FIGS. 3A and 3B will be explained with reference to FIGS. 4 and 5.

Figure 4:
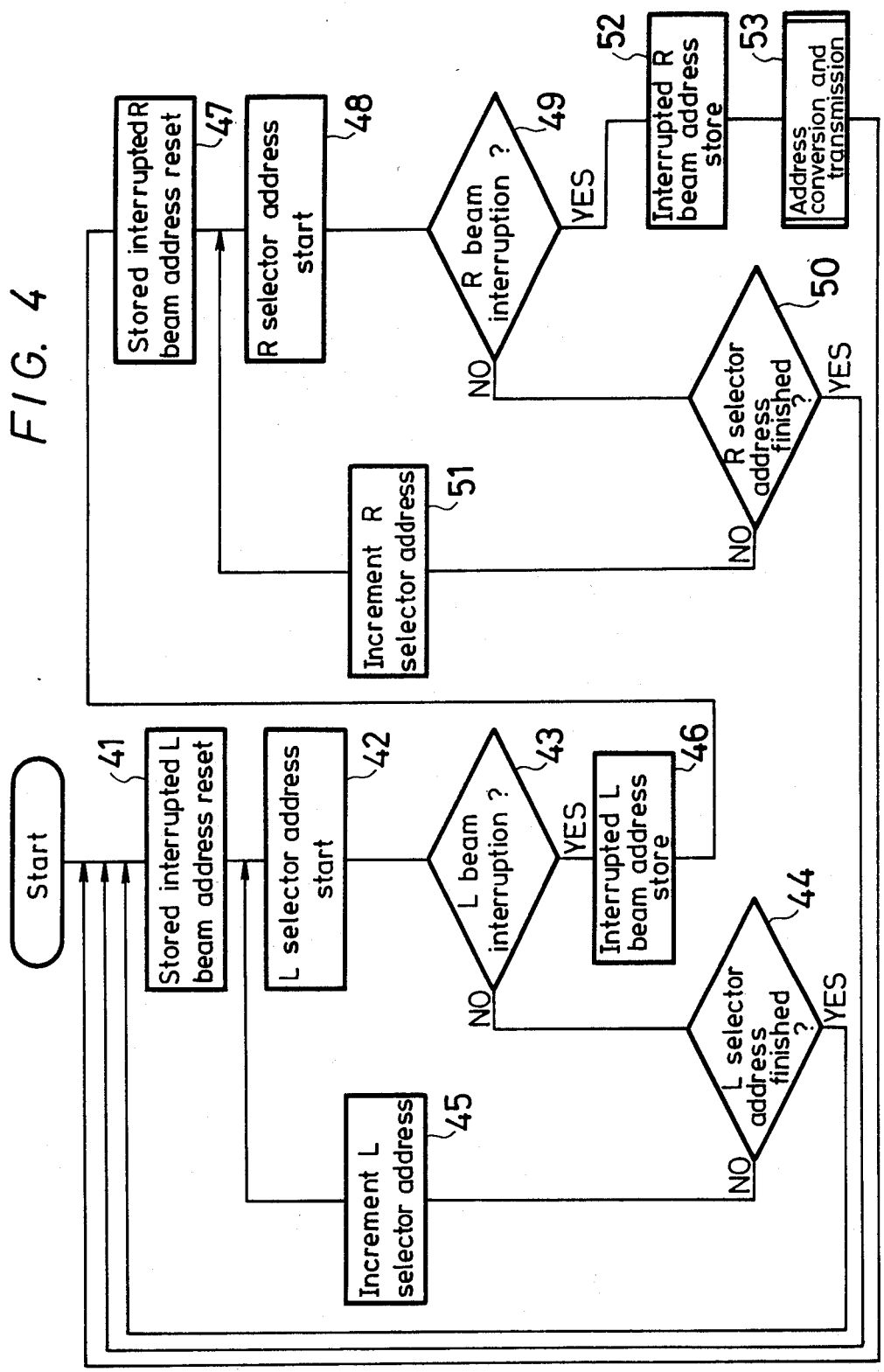
FIG. 4 is a flow chart used for explaining one possible operation of the circuit shown in FIGS. 3A and 3B.
Figure 5:
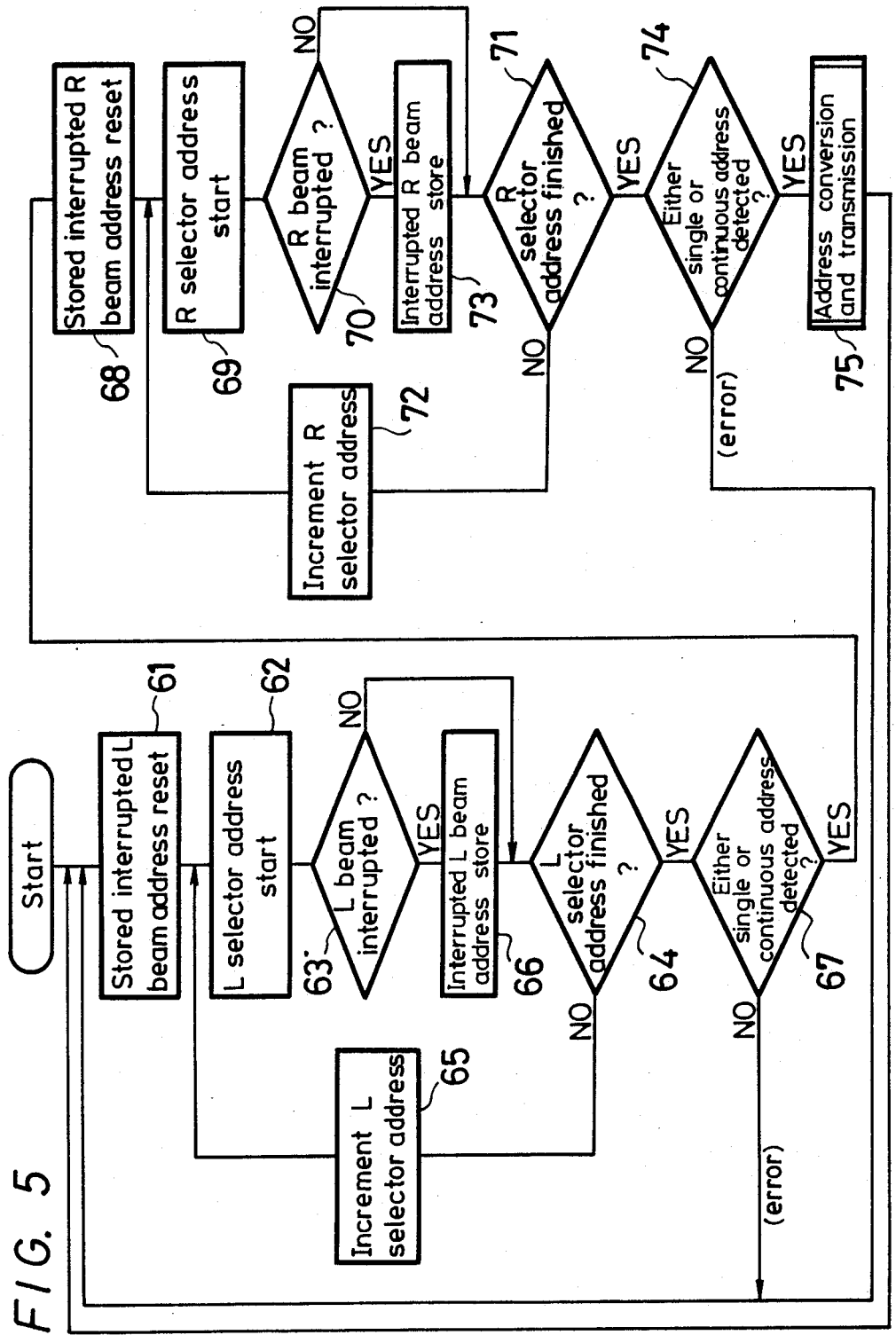
FIG. 5 is a flow chart used for explaining another possible operation of the circuit shown in FIGS. 3A and 3B.

FIG. 4 is a flowchart of the aforementioned scan stop system which stops subsequent scanning when one beam interruption is detected, and FIG. 5 a sequence scan system which completes scanning through the whole display area regardless of detection of beam interruption.

First, an explanation will be given of the operation of the circuit shown in FIGS. 3A and 3B with reference of FIG. 4. At step 41, the contents of the memory of the microcomputer 21, which stores the address of a previously interrupted L beam are cleared. Next, at step 42, the selectors 22 and 26 are supplied with address data from the microcomputer 21 to energize the light emitting diodes 11 and the photo transistors 12 corresponding to the address data, thereby forming and receiving the corresponding L beam.

It is detected at step 43 whether the L beam is interrupted or not by a finger or the like. If the answer to step 43 is NO, the program proceeds to step 44 wherein it is determined whether the address data currently supplied to the selectors 22 and 26, which scan the light emitting diodes 11 and the photo transistors 12 in connection with the L beams, is the last address or not. If the answer to step 44 is NO, the address data to the selectors 22 and 26 is incremented by one at step 45, and the program returns to step 42 to repeat the same operations of the above-mentioned steps 42–44. If it is determined at step 44 that the address data is last one, that is, if none of the L beams have been interrupted, the program returns to step 41 and the above-mentioned operations are repeated.

If it is detected at step 43 that the L beam is interrupted, the corresponding address data supplied to the selectors 22 and 26, which select the light emitting diode 11 and the photo transistor 12 which concern the interrupted L beam, is stored in the memory of the microcomputer 21 as information on the L coordinate. The address data detected at this time indicates the position at which the L beam is first interrupted.

Next, the program proceeds to step 47 to clear the contents of the memory of the microcomputer 21 which stores the address of the interrupted R beam when the selectors 29 and 32 are selected. Then, address data is supplied from the microcomputer 21 to the selectors 29 and 32 at step 48 to energize the light emitting diode 11 and the photo transistor 12 corresponding to the supplied address data, thereby forming and receiving the corresponding R beam.

It is detected at step 49 whether the R beam is interrupted by a finger or the like. If the answer to step 49 is NO, the program proceeds to step 50 wherein it is determined whether the address data currently supplied to the selectors 29 and 32 concerning the R beam is the last one or not. If the answer to step 50 is NO, the address data supplied to the selectors 29 and 32 is incremented by one at step 51, and the program returns to step 48 to repeat the same operations of the above-mentioned steps 48–51. On the other hand, if it is determined at step 50 that the address data exceeds the last one, that is, if none of the R beams have been interrupted, the program returns to step 41 and the above-mentioned operations are repeated.

If interruption of an R beam is detected at step 49, the corresponding address data supplied to the selectors 29 and 32 which select the light emitting diode 11 and the photo transistor 12 which concern the interrupted R beam is stored in the memory of the microcomputer 21 as information on the R coordinate. The address data detected at this time indicates the position at which the R beam is first interrupted.

Figure 6:
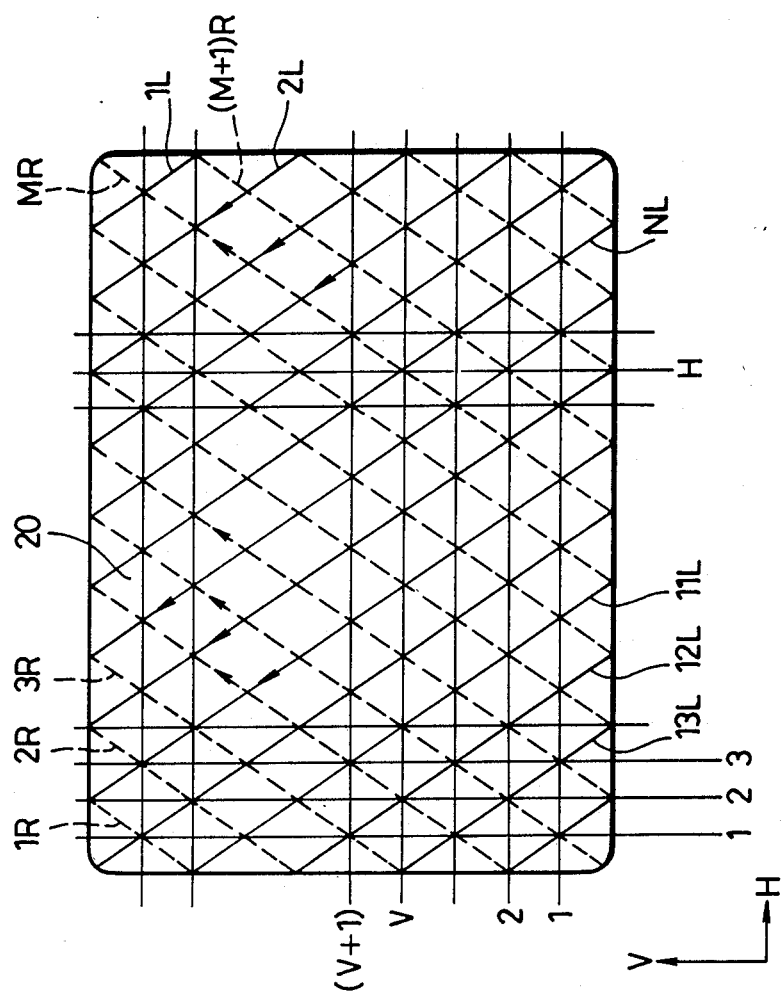
FIG. 6 is a diagram used for explaining ... the coordinate conversion.

Finally, at step 53, the interrupted L beam and R beam address data stored in the memory of the microcomputer 21 are read out in order to calculate the L and R coordinate values. The L and R coordinate values thus derived by the above-mentioned operation are next converted to values in orthogonal coordinates by the microcomputer 21 and transmitted to a host computer after conversion of the detected coordinates. For example, if the coordinate values detected as described above are assumed to be preliminary coordinate values (oblique coordinate values) (NL, MR), the objective coordinate values (Hx, Vy) in the orthogonal coordinates corresponding to the preliminary coordinate values (NL, MR) are previously stored in a ROM built in the microcomputer 21. Therefore, the true objective coordinate values (Hx, Vy) can be derived by performing a conversion (NL, MR)→(Hx, vy) in the relationship as shown in FIG. 6.

Next, the operation shown in FIGS. 3A and 3B will be explained with reference to FIG. 5.

At step 61, the contents of the memory of the microcomputer 21, which stores the address of a previously interrupted L beam are cleared. Next, at step 62, the selectors 22 and 26 are supplied with address data from the microcomputer 21 to energize the light emitting diode 11 and the photo transistor 12 corresponding to the address data, thereby forming and receiving the corresponding L beam.

It is detected at step 63 whether or not the L beam corresponding to the address data supplied to the selectors 22 and 26 is interrupted by a finger or the like. If the answer to step 63 is NO, the program proceeds to step 64 wherein it is determined whether the address data currently supplied to the selectors 22 and 26 concerning the L beam exceeds the last address or not. If the answer to step 64 is NO, the address data supplied to the selectors 22 and 26 is incremented by one at step 65, and the program returns to step 62 to repeat the same operations of the above-mentioned steps 62–65.

If interruption of the L beam is detected at step 63, the corresponding address data supplied to the selectors 22 and 26, which select the light emitting diode 11 and the photo transistor 12 which concern the interrupted L beam, is stored in the memory of the microcomputer 21 as information on the L coordinate. Next, the program proceeds to step 64 and the above-mentioned operations are repeated.

If it is determined at step 64 that the address data is the last one, that is, when all the L beams are scanned regardless of the presence or the absence of interrupted L beam, the program proceeds to step 67 wherein it is detected whether the address data detected in accordance with the beam interruption is single, sequential or other than that. If the answer to the step 67 is YES, the program proceeds to step 68. If the answer to the step 67 is NO, the program returns to step 61 to repeat the above-mentioned operations.

At step 68 the contents of the memory of the microcomputer 21 which stores the address of the interrupted R beam are cleared up. Then, address data is supplied from the microcomputer 21 to the selectors 29 and 32 at step 48 to energize the light emitting diode 11 and the photo transistor 12 corresponding to the supplied address data, thereby forming and receiving the corresponding R beam.

It is detected at next step 70 whether or not the R beam is interrupted by a finger or the like. If the answer to step 70 is NO, the program proceeds to step 71 wherein it is determined whether the address data currently supplied to the selectors 29 and 32 which change over the light emitting diode 11 and the photo transistor 12 is the last address or not. If the answer to step 71 is NO, the address data supplied to the selectors 29 and 32 is incremented by one at step 72, and the program returns to step 69 to repeat the same operations of the above-mentioned steps 69–72.

On the other hand, if it is determined at step 70 that the R beam interruption exists, the address data corresponding to the interrupted R beam formed and received by the light emitting diode 11 and the photo transistor 12 selected by the selectors 29 and 32 is stored in the memory of the microcomputer 21 as information on the R coordinate. Then, the program proceeds to step 71 to repeat the above-mentioned operations.

If it is determined at step 71 that the address data is the last address, that is, if the scanning of the R beams has all been terminated regardless of the presence of interrupted R beams, the program proceeds to step 74 wherein it is detected whether the address data in the memory corresponding to the detected interrupted R beams is single, sequential or other than that. If the answer to step 74 is YES, the program proceeds to step 75. Otherwise, the program returns to step 61 to repeat the above-mentioned operation.

At step 75, each of the address data stored in the memory of the microcomputer 21 is read out to calculate the L and R coordinates. If the stored address data is single, the L and R coordinate values are determined by duplicating the stored address data. If there are a plurality of the stored address data, the L and R coordinate values are determined on the basis of the addition of the first and second ones.

The L and R coordinate values thus determined by the microcomputer 21 are converted to orthogonal coordinate values. For example, if the coordinate values detected as described above are assumed to be preliminary coordinate values (oblique coordinate values) (NL, MR), the objective coordinate values (Hx, Vy) in the orthogonal coordinates corresponding to the preliminary coordinate values (NL, MR) are previously stored in a ROM built in the microcomputer 21. Therefore, the true objective coordinate values (Hx, Vy) can be derived by performing the following conversion under the relationship shown in FIG. 6:

(NL, MR)→(Hx, Vy).

Incidentally, in the above embodiment, explanation was given of the case where the L and R beams are respectively selected as five. However, it will be understood that it is a mere example and an arbitrary number of the L and R beams may be selected. Also, the numbers of the light emitting diodes 11, the photo transistors 12 and the fixed contacts of the selectors 22, 26, 29 and 32 may be arbitrarily selected in accordance with the number of the beams.

According to the present invention as described above, in the touch panel apparatus having a first group of beams which are skewed in the right direction with respect to a rectangular display screen and aligned from the upper left to the lower right and a second group of beams which are skewed in the left direction with respect to the display screen and aligned from the upper right to the lower left, the first (or last) interrupted beam of the beams aligned from the upper left to the lower right direction in the first group is used as the base beam to derive a first coordinate value while the first (last) interrupted beam of the beams aligned from the upper right to the lower left direction in the second group is used as the base beam to derive a second coordinate value. If two or more beams are sequentially interrupted in the process of deriving the first and second coordinate values, the intermediate values of the coordinate values of the base beam and the coordinate values of the interrupted beam adjacent thereto are determined as the first and second coordinate values. Further, if three or more beams are sequentially interrupted in the process of deriving the first and second coordinate values, the mean values of the interrupted beams are determined as the first and second coordinate values. The coordinate values in the orthogonal coordinates are calculated from the first and second coordinate values thus determined; so that it is possible to largely reduce malfunctions due to fingers other than that indicating a desired point on the touch panel and also prevent malfunctions caused by a plurality of interrupted beams.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

I claim as my invention:

1. A touch panel apparatus comprising:
   a display having a display surface;
   a first beam generating means for generating a first set of beams skewed in a first diagonal direction, arranged in parallel to each other and aligned from a first upper side of the display surface to the lower opposite side of the display surface of said display;
   a first beam scanning means coupled to said first beam generating means for scanning said display surface by said first set of beams with a predetermined sequence;
   a second beam generating means for generating a second set of beams skewed in a second diagonal direction, arranged in parallel to each other and aligned from a second upper side of the display surface to the lower opposite side of the display surface of said display;
   a second beam scanning means coupled to said second beam generating means for scanning said display surface by said second set of beams with a predetermined sequence;
   first detecting means for determining a first address based on an interrupted beam first appearing in the alignment sequence of said first set of beams; and
   second detecting means for determining a second address based on an interrupted beam first appearing in the alignment sequence of said second set of beams.

2. A touch panel apparatus as recited in claim 1, wherein the first set of beams is directed from the upper left to the lower right of the display surface and the second set of beams is directed from the upper right to the lower left of the display surface.

3. A touch panel apparatus as recited in claim 1, further comprising:
   address determining means coupled to said first and second detecting means for generating a final address by calculating a mean value of addresses of interrupted light beams in a row.

4. A touch panel apparatus as recited in claim 3, wherein said address determining means determines final address by calculating a mean value of the first two addresses among addresses of interrupted light beams in a row.

5. A touch panel apparatus as cited in claim 1, wherein said first and second beam scanning means scan said display surface with every other beams of said first set of beams and second set of beams and then the rest of beams, respectively.

* * * * *